United States Patent [19]

Kerling

[11] Patent Number: 4,481,529
[45] Date of Patent: Nov. 6, 1984

[54] TRICOLOR VIDEO SIGNAL GENERATOR, SUCH AS A VIDEO GAME, USABLE WITH A MONOCHROME PICTURE DISPLAY DEVICE

[75] Inventor: Jean-Marie Kerling, Nanterre, France

[73] Assignee: U.S. Philips Corporation, New York, N.Y.

[21] Appl. No.: 382,736

[22] Filed: May 27, 1982

[30] Foreign Application Priority Data

Jun. 1, 1981 [FR] France .................. 81 10767

[51] Int. Cl.³ .................................... H04N 9/52
[52] U.S. Cl. ...................... 358/30; 273/1 E; 273/DIG. 28; 358/37; 358/82; 340/793
[58] Field of Search ............... 273/DIG. 28; 358/27, 358/30, 37, 22, 147, 166; 340/701–704, 715, 793

[56] References Cited

U.S. PATENT DOCUMENTS

| | | | |
|---|---|---|---|
| 4,121,283 | 10/1978 | Walker | 273/DIG. 28 |
| 4,200,867 | 4/1980 | Hill | 273/DIG. 28 |
| 4,229,760 | 10/1980 | Avery | 273/DIG. 28 |
| 4,236,175 | 11/1980 | Groothuis | 358/30 |
| 4,261,009 | 4/1981 | Tomimoto et al. | 358/30 |

FOREIGN PATENT DOCUMENTS 956025 10/1974 Canada ........................ 358/30

*Primary Examiner*—Richard C. Pinkham
*Assistant Examiner*—MaryAnn Stoll
*Attorney, Agent, or Firm*—Thomas A. Briody; William J. Streeter; Edward W. Goodman

[57] ABSTRACT

A tri-color video signal generator, for use with either a color or black and white standard television receiver, includes a circuit for producing the color signals R, V, B and a matrix circuit for producing a luminance signal Y from the color signals. The generator further includes circuitry for modifying the respective proportions of the R, V, B color signals in the luminance signal Y whereby in a black and white receiving mode, the grey scale of the luminance signal Y is modified making it possible to accentuate the contrast between the picture elements whose original colors would have been converted into luminance levels which are very near one another.

5 Claims, 9 Drawing Figures

TRICOLOR VIDEO SIGNAL GENERATOR, SUCH AS A VIDEO GAME, USABLE WITH A MONOCHROME PICTURE DISPLAY DEVICE

BACKGROUND OF THE INVENTION

The present invention relates to a tricolor video signal generator, such as a video game, usable with a monochrome picture display device, said generator comprising inter alia a circuit producing red (R), green (V) and blue (B) color signals, and a resistive matrix network deriving a luminance signal (Y) from the three above-mentioned color signals.

The invention has particularly, but not exclusively, for its object the so-called "video" games intended to be connected to a television set, either to the aerial input, or to the video input for peripheral equipment with which current television sets are equipped.

Almost all the video games which are manufactured at present are designed for use with a color television set, and their possible connection to a black-and-white television set poses a problem of contrast for the use of certain programmable games.

It is known that because of the requirements for compatibility, a picture which is transmitted encoded in color can usually be displayed on a black-and-white television set, the different color hues then being represented by luminance levels from black to purely white, including intermediate grey-values. This does not offer any disadvantage for the reception of a moving picture, which is perfectly visible in spite of the absence of the original color information.

This does not hold for certain video games where the color information constitutes a main element for recognizing certain elements in the received picture; so two very different colors may be represented by two grey-shades whose luminance values are very close to each other, and which consequently are very difficult to differentiate.

This situation may be disadvantageous for the commercial distribution of video games as the circumstances in which they can be used with a black-and-white television set are very numerous: a second television set in the house, a second house in which a black-and-white television set is installed, etc.

The same difficulty may occur with the use of certain microprocessors which usually employ a normal, commercially available television set as the display terminal, and where the interpretation of text, graphs, etc. in black and white has the same problem as regards contrast.

It is also possible to mention for a near future the case where it may be desired to connect a video game or a microprocessor to a video text receiver or an electronic telephone directory, which enlarges the field of application of these apparatus.

The French Patent Specification No. 2,417,901 describes a circuit by means of which it is possible to modify the grey scale of a monochrome picture display device, and more particularly to increase the luminance level of the signals which are too close to the black level; however, said circuit is more specifically intended for incorporation in a picture display device which renders it impossible to use it in a normal, commercially available television set; moreover it only acts on the levels close to black, such as blue, it definitely does not act on the difference between two colors whatever their position in the grey-scale and it requires combinations of comparatively complicated and costly logic and analog circuits.

SUMMARY OF THE INVENTION

One of the objects of the present invention is to provide a simple and economical means to the user of a generator such as a video game for modifying optionally the grey scale of the reproduced picture to give it such a contrast that it is possible to use it in a way comparable to that of a color picture.

According to the invention, a tricolor video signal generator, such as a video game, usable with a monochrome picture display device, said generator comprising inter alia a circuit producing red (R), green (V) and blue (B) color signals and a resistive matrix circuit producing a luminance signal (Y) from the three above-mentioned color signals, is particularly characterized in that the resistive matrix network comprises at least a manual control for modifying the respective ratios between the signals R, V, B in the luminance signal Y.

Advantageously, the manual control is a continuously variable control, and setting or switch-over means, by means of which it is possible to re-establish the normal "color" balance of the luminance signal, are provided.

By acting on the characteristics of the matrix network, the grey scale of the image is modified, which allows the user to obtain a maximum contrast between the elements of the image before they are differentiated.

Several embodiments render it possible to satisfy all the specific requirements of the pictures to be reproduced in black and white, while the normal "color" balance can be re-established at any instant for use in a tri-color television set.

DESCRIPTION OF THE DRAWINGS

The following description, given by way of example with reference to the accompanying drawings, will make it better understood how the invention can be put into effect.

The FIGS. 3, 4, 5, 6, 7A, 7B and 8 show seven different embodiments of the matrixing modifying control in accordance with the invention.

DESCRIPTION OF THE PREFERRED EMBODIMENTS

Figure 1:
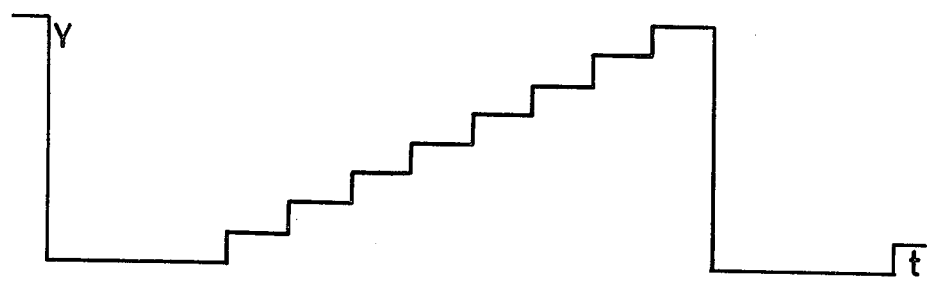
FIG. 1 shows the luminance signal Y associated with a color bar test pattern transmitted in television.

In FIG. 1, the amplitude of the luminance signal for the different color bars is obtained by matrixing the signals R, V, B, in accordance with the following relation: $Y(\text{luminance}) = 0.30R + 0.59V + 0.11B$.

It can be seen that in these conditions two colors which for the eye show a very large contrast, for example blue and red, are displayed in black and white as two grey shades which are very close to each other, however small the matrixing tolerances are in a disadvantageous sense, in practice it will be impossible to differentiate between these two greys.

If, in contrast therewith, the proportion of red with respect to blue is increased in the luminance signal, the two corresponding greys will then be easy distinguishable.

Figure 2:
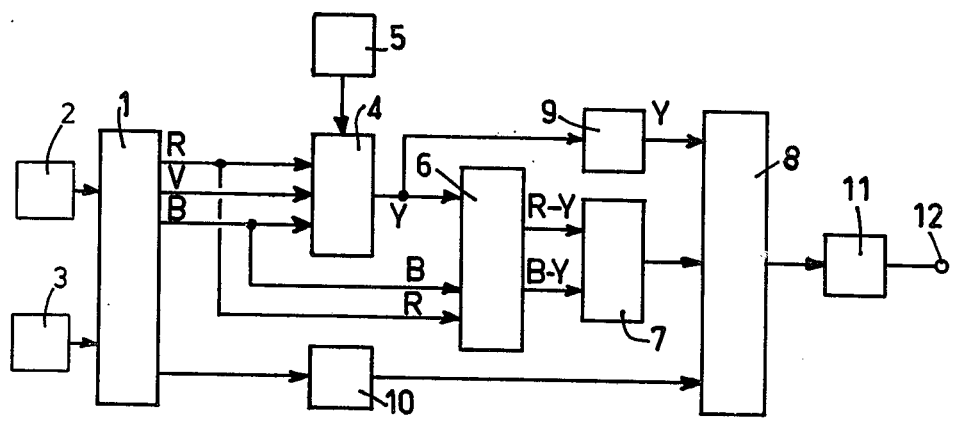
FIG. 2 represents a simplified block schematic circuit diagram of a video game incorporating the matrixing modifying control for the signals R, V, B in accordance with the invention.

In FIG. 2 a game signal processing circuit 1 has two inputs which are connected to two manual game controls 2 and 3, three digital game signal outputs R, V, B and a synchronizing signal output.

The digital signals R, V, B are applied to the input of a resistive matrixing network 4 which has a luminance signal output Y.

In accordance with the invention, the matrixing network 4 has a manual control 5 for modifying the respective ratios of the signals RVB in the luminance signal Y.

The inputs of a second matrixing network 6 are connected to the output Y of the matrix 4, and to the outputs R and B of the circuit 1. The network 6 has two color difference signal outputs R-Y and B-Y which are connected to the inputs of a coding circuit 7.

The three inputs of a mixer circuit 8 are connected to the output of a luminance signal matching circuit 9 (a delay line), to the "chrominance" output of the coding circuit 7 and to the output of a circuit 10 for shaping the synchronizing signals supplied by the circuit 1, respectively.

The "video-composite" output of the mixer circuit 8 is connected to the modulation input of a VHF or UHF generator 11 which has an "aerial" output 12.

In the generator shown in FIG. 2, in which a possible "sound" path is not shown, the modification of the balance of the luminance signal Y by means of the control 5 is also found in the composite video signal supplied by the circuit 8; the coding circuit 7 processes the signals R-Y and B-Y in accordance with the SECAM, PAL or NTSC standards depending on the type of color television set employed.

It should be noted that the block schematic circuit diagram of FIG. 2 applies equally well to a microprocessor, the circuit 1 then being the processing unit and the controls 2 and 3, for example a keyboard and a disc memory.

Also, in a manner not shown, the output of the mixer circuit 8 has a terminal intended to be connected to the "composite video" input of television sets which are equipped with a "video input for peripheral equipment".

Figure 3:
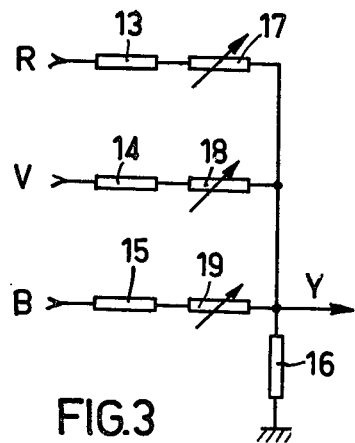

FIG. 3 shows a first embodiment of the control for modifying the ratios of the signals R, V, B in the luminance signal Y; the matrixing network comprises four fixed resistors 13, 14, 15 and 16, and three variable resistors 17, 18 and 19, which are arranged in series with the three first-mentioned fixed resistors.

By acting on any of the resistors 17, 18 and 19, the level of the corresponding color in the signal Y is modified. The detection of the normal ratio "color" can be effected by providing the variable resistors 17, 18 and 19 either with a detection index, or with a positioning "notch" half-way; in the latter case, the value of the corresponding series resistor will be chosen in such a way that the total resistance corresponds to the normal "color" matrix.

Figure 4:
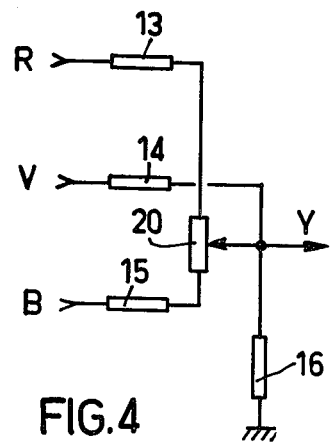

In FIG. 4, in which the same reference numerals are used as in FIG. 3, a potentiometer 20 is arranged between the resistors 13 and 15, the sliding contact of this potentiometer being connected to the junction between the resistors 14 and 16; in this case operating the potentiometer 20 causes the respective ratios of the red and blue levels in the luminance signal to vary in the opposite sense, the green level remaining substantially fixed.

Figure 5:
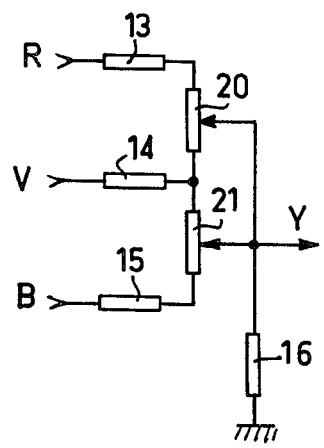

In FIG. 5, in which the same reference numerals are used as in the FIGS. 3 and 4, the potentiometer 20 is arranged between the resistors 13 and 14, a second potentiometer 21, whose sliding contact is connected to the sliding contact of the first potentiometer, being arranged between the resistors 14 and 15; in this way, the respective ratios of the signals R, V, B in the luminance signal can be modified.

Figure 6:
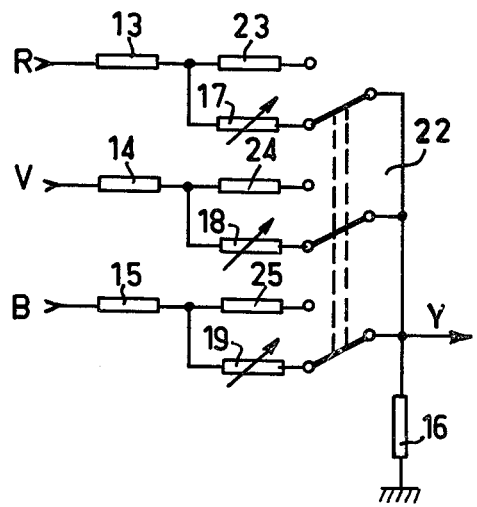

In FIG. 6, in which the same reference numerals are used as in the FIGS. 3, 4 and 5, the circuit diagram of the matrixing network corresponds to the circuit diagram of FIG. 3 to which a triple pole double throw switch 22 which is shown in the "black and white" position is added. In the "color" position three fixed resistors 23, 24 and 25 are arranged in series with the respective resistors 13, 14 and 15 in such a way as to re-establish the normal matrix.

Figure 7A:
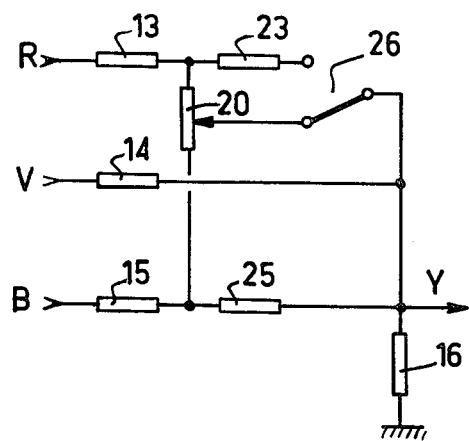

In FIG. 7A in which the same reference numerals are used as in the FIGS. 3, 4, 5 and 6, the circuit diagram of the matrixing network corresponds to that shown in FIG. 4 to which a double throw switch 26 shown in the "black and white" position has been added; in the "color" position the resistor 23, which is arranged in series with the resistor 13, re-establishes the normal matrix.

Figure 8:
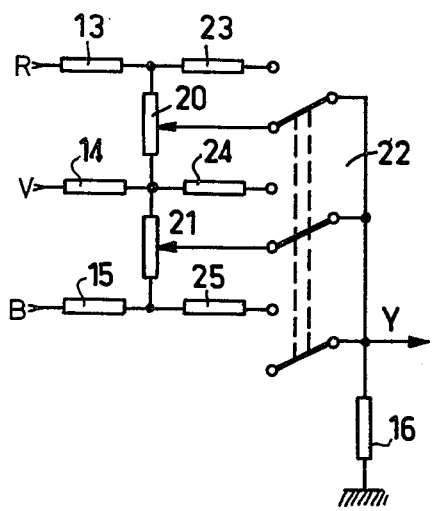

In FIG. 8, in which the same reference numerals are used as in the FIGS. 3, 4, 5, 6 and 7A, the circuit diagram of the matrixing circuit corresponds to that shown in FIG. 5 to which a triple pole double throw switch 32 has been added, and fixed resistors 23, 24 and 25 being arranged in series with the resistors 13, 14 and 15 in the "color" position.

The use of a "color" and "black and white" inverter in the circuit diagrams of the FIGS. 6, 7A and 8 renders it optionally possible to provide variable resistors or potentiometers in the generator after a non-recurrent adjustment of these resistors, which makes it easier for the user to manipulate the set.

Figure 7B:
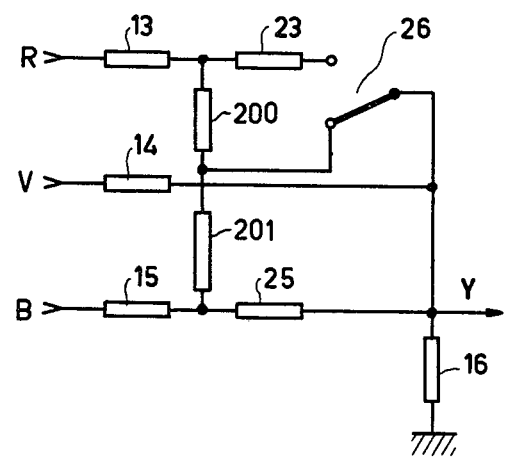

It is alternatively possible to replace the variable resistors or preset potentiometers by a voltage divider formed by two fixed resistors such as, for example, resistor 200 or 201 of FIG. 7B, which corresponds to the potentiometer 20 of FIG. 7A.

The variations of the embodiments shown in FIGS. 3 to 8 satisfy almost all the requirements imposed in practice on video game generators; in any case, it is within the skill of a person skilled in the art to conceive, without departing from the framework of the invention, modifications to the above-mentioned circuit diagrams to meet a specific situation occurring when a different type of generator is employed.

For the circuit diagrams shown in the FIGS. 3, 5, 6 and 8, it may be advantageous to couple mechanically, in a manner not shown, the sliding contacts of the two or three variable resistors or potentiometers so that there is only one single control to be handled by the user.

What is claimed is:

1. A tri-color video signal generator having a signal output for connecting said generator to the antenna input of a color or a black and white standard television receiver, said generator comprising inter alia a circuit producing red (R), green (V) and blue (B) color signals, and a resistive matrix network having branches to which said color signals are applied, respectively, for deriving a luminance signal from said color signals, characterized in that each of the branches of said resistive matrix network which receive the signals R, V, B, comprises a variable resistor, a fixed resistor arranged in parallel with said variable resistor, switching means for selectively coupling said fixed or said variable resistor to said luminance output, and a manual control, coupled to at least said switching means, for modifying the respective ratios between the color signals R, V, B in the luminance signal, said manual control having a first and a second setting wherein, in said first setting, the R, V, B-ratio for generating the luminance signal corresponds to that required for said color television receiver, while, in said second setting, the RVB-ratio results in a luminance signal having a grey-scale suitable for said black and white television receiver.

2. A video signal generator as claimed in claim 1, characterized in that the sliding contacts of at least two of the variable resistors are coupled mechanically.

3. A tri-color video signal generator having a signal output for connecting said generator to the antenna input of a color or a black and white standard television receiver, said generator comprising inter alia a circuit producing red (R), green (V) and blue (B) color signals, and a resistive matrix network having branches to which said color signals are applied, respectively, for deriving a luminance signal from said color signals, characterized in that said generator further comprises a first voltage divider arranged between two of the branches of said resistive matrix network, a second voltage divider arranged between a further one of said branches and one of said two branches, a junction point of each of said voltage dividers being connected to the luminance output of said resistive matrix network, and a manual control for said resistive matrix network for modifying the respective ratios between the color signal R, V, B in the luminance signal Y, said manual control having a first and a second setting wherein, in said first setting, the R, V, B-ratio for generating the luminance signal corresponds to that required for said color television receiver, while, in said second setting, the R, V, B-ratio results in a luminance signal having a grey-scale suitable for said black and white television receiver.

4. A video signal generator as claimed in claim 3, characterized in that the voltage dividers are in the form of potentiometers whose sliding contacts are coupled mechanically.

5. A tri-color video signal generator having a signal output for connecting said generator to the antenna input of a color or a black and white standard television receiver, said generator comprising inter alia a circuit producing red (R), green (V) and blue (B) color signals, and a resistive matrix network having branches to which said color signals are applied, respectively, for deriving a luminance signal from said color signals, characterized in that said generator further comprises a voltage divider arranged between two of the branches of said resistive matrix network, a double throw switch for selectively connecting a junction point of said voltage divider and one of said two branches to the luminance output, and a manual control coupled at least to said switch for modifying the respective ratios between color signals R, V, B in the luminance signal, said manual control having a first and a second setting wherein, in said first setting, the R, V, B-ratio for generating the luminance signal corresponds to that required for said color television receiver while, in said second setting, the R, V, B-ratio results in a luminance signal having a grey-scale suitable for said black and white television receiver.

* * * * *